United States Patent [19]

Kawatsuki et al.

[11] Patent Number: 4,749,245
[45] Date of Patent: Jun. 7, 1988

[54] THIN FILM WAVEGUIDE DEVICE AND MANUFACTURING METHOD FOR MAKING SAME

[75] Inventors: Nobuhiko Kawatsuki; Masao Uetsuki, both of Kurashiki; Junji Nakagawa, Ichikawa, all of Japan

[73] Assignee: Kuraray Co., Ltd., Japan

[21] Appl. No.: 836,845

[22] Filed: Mar. 6, 1986

[30] Foreign Application Priority Data

Mar. 11, 1985 [JP] Japan .................. 60-48847

[51] Int. Cl.$^4$ .................. G02B 6/10; C08F 18/16; B05D 5/06
[52] U.S. Cl. .................. 350/96.12; 350/96.11; 350/96.34; 350/320; 526/329.7; 427/162; 427/163; 427/372.2
[58] Field of Search ............... 350/96.11, 96.12, 96.13, 350/96.14, 96.34, 320; 156/668; 526/329.7; 427/162, 163, 314, 316, 333, 335, 372.2, 384, 386, 407.1, 410, 412.5, 164

[56] References Cited

U.S. PATENT DOCUMENTS

| | | | |
|---|---|---|---|
| 3,097,106 | 7/1963 | Blout et al. | 427/163 X |
| 3,767,445 | 10/1973 | Chandross et al. | 427/163 X |
| 3,819,782 | 6/1974 | Irie | 350/96.34 |
| 3,839,067 | 10/1974 | Sosnowski et al. | 350/96.12 X |
| 3,953,620 | 4/1976 | Chandross et al. | 350/96.12 X |
| 3,955,015 | 5/1976 | Ohtsuka | 427/163 |
| 3,982,810 | 9/1976 | Tamir et al. | 350/96.12 X |
| 3,993,485 | 11/1976 | Chandross et al. | 350/96.34 |
| 4,087,159 | 5/1978 | Ulrich | 350/96.12 |
| 4,120,588 | 10/1978 | Chaum | 350/96.12 X |
| 4,240,849 | 12/1980 | Kurokawa et al. | 156/73.2 X |
| 4,581,252 | 4/1986 | Guerra et al. | 427/162 |
| 4,609,252 | 9/1986 | Wong et al. | 350/96.12 |
| 4,610,502 | 9/1986 | Nicia et al. | 350/96.12 |
| 4,615,962 | 10/1986 | Garito | 430/20 X |

FOREIGN PATENT DOCUMENTS

| | | | |
|---|---|---|---|
| 59-151107 | 8/1984 | Japan | 350/96.12 X |
| 61-228403 | 10/1986 | Japan | 350/96.11 X |

OTHER PUBLICATIONS

Pogorelov et al., "Thin-Film Optical Waveguides made of Organic Compounds", Sov. J. of Quant. Elect., vol. 5, No. 8, 1976, pp. 1014–1016.
Ramaswamy et al., "Low-Loss Polymer Films with Adjustable Refractive Index", Applied Optics, vol. 12, No. 7, 7/73, pp. 1581–1583.
Mahoney et al., "Polystyrene Solution-Deposited Optical Waveguides and Couplers", Pro. of the IREE, 11/75, pp. 369–371.
Kurokawa et al., "Polymer Optical Circuits for Multimode Optical Fiber Systems", Applied Optics, vol. 19, No. 18, 9/80, pp. 3124–3129.
F. Mohring et al., "Wave Propagation in Low-Loss Acrylic Resin Films", Optical and Quantum Electronics, 7 (1975), 443–446.
Takashi Aoyagi et al., "High-Efficiency Blazed Grating Couplers", Applied Physics Letters, vol. 29, No. 5, Sep. 1, 1976 (303–304).

Primary Examiner—William L. Sikes
Assistant Examiner—Brian M. Healy
Attorney, Agent, or Firm—Ostrolenk, Faber, Gerb & Soffen

[57] ABSTRACT

A thin film waveguide path comprises a waveguide path layer overlying a substrate but separated therefrom by at least one intermediate layer. The waveguide path layer comprises a first transparent high molecular material. The at least one intermediate layer comprises a second organic high molecular material having a solubility different from that of the first material and a lower refractive index lower than that of the first material, the substrate comprises a third high molecular material different from the first and second materials for supporting the waveguide path and intermediate layers.

7 Claims, 1 Drawing Sheet

THIN FILM WAVEGUIDE DEVICE AND MANUFACTURING METHOD FOR MAKING SAME

BACKGROUND OF THE INVENTION

This invention relates to a thin film waveguide path which is formed of organic high molecular material with extremely low beam propagation loss.

A low loss wavegide path is known in the art which comprises a thin film waveguide path of acryl series resin coated on a quartz glass substrate that is optically polished, by a spin coat method (e.g. Optical and Quantum Electronics, Vol. 7, 1975, pages 443–446). A further known known art is waveguide path comprises a polymethyl methacrylate (PMMA) substrate and a nitrocellulose thin film waveguide path layer (e.g. Applied Physics Letters, Vol. 29, No. 5; Sept. 1, 1976, pages 303–304).

The first-mentioned waveguide path is not only convenient as it is formed with the spin coat method, but also has the advantage of very reduced value of 0.13 dB/cm of the beam propagation loss of 0.13dB/cm. However, the cost of second-mentioned materials to implement the waveguide path is very expensive.

On the other hand, the second-mentioned waveguide path has low materials cost but has the drawback of high beam propagation loss. An additional known waveguide path is disclosed Japanese Laid-Open Patent Publication No. 59/1984–151107 in which the substrate of the waveguide path is formed of the high molecular compound, and a beam waveguide path is formed of an organic compound or high molecular compound on the substrate. However, such beam waveguide path suffers from the drawback of high beam propagation loss.

As discovered by the present inventors, the beam propagation loss of a waveguide path formed by applying a spin coat on a plastic substrate cannot be lowered, regardless of how carefully the the spin coat, typically comprising an organic high molecular material is prepared.

High molecular materials for beam waveguide paths, such as polycarbonate (PC), polystyrene (PSt), PMMA and polysulfone (PSF), which are transparent plastics, are generally close together in solubility parameters and dissolve well in hydrocarbon halides, such as dichloromethane and chloroform, and also in hydrocarbons such as tetrahydrofuran (THF) and benzene. When such a high molecular material is dissolved in the foregoing solvents and coated on an optically polished glass substrate, the coated thin film exhibits good uniformity and it is easy to produce a thin film beam waveguide path with a propagation loss of less than 1 dB/cm. However, when the transparent plastic is coated on a plastic substrate (e.g., PC, PMMA) by employing hydrocarbon halide as a solvent, it is difficult if not impossible to produce no matter how carefully the process is controlled, an excellent light waveguide path of low light propagation loss less than 20 dB/cm; and, hence, such transparent material is unfit for use as a light waveguide path.

SUMMARY OF THE INVENTION

A first object of this invention is to provide a thin film waveguide path comprising inexpensive organic, high molecular material.

A second object of the invention is to provide a waveguide path having an extremely low propagation loss.

A third object of the invention is to provide a waveguide path which is durable.

A fourth object of the invention is to provide a method for manufacturing a waveguide path.

In brief summary, a light waveguide path comprising plastic material of low cost but having excellent and extremely low propagation loss is provided. As compared with a waveguide path associated with a conventional glass substrate, it is possible to reduce the weight to less than half. Further, while a path with the conventional glass substrate requires polishing and is difficult to form it into an arbitrary shape, the present invention affords an easy shaping of its substrate, and, further, both the substrate and light waveguide path layer are made of synthetic resin. Accordingly, a remarkably low cost light waveguide path can be produced.

Other objects, features and advantages of the invention will become apparent from the following description, together with the accompanying drawings and the appended claims.

DETAILED DESCRIPTION OF THE PREFERRED EMBODIMENTS

Figure 1:
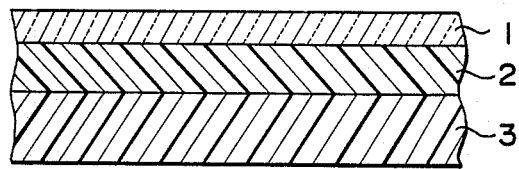
FIGS. 1, 2 and 3 are cross sectional views of a beam waveguide path according to the present invention.
Figure 2:
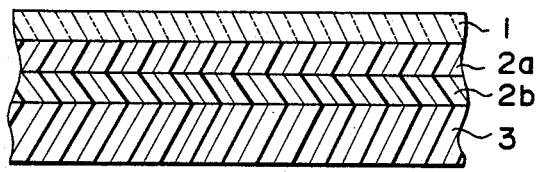
Figure 3:
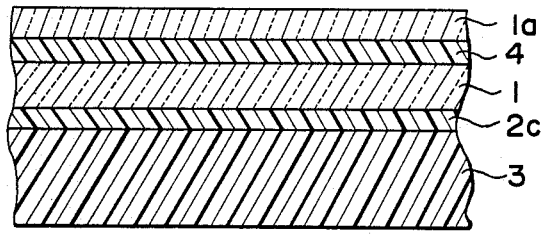

In FIGS. 1-3, numerals 1 and 1a pertain high molecular waveguide path layers, 2, 2a, 2b and 2c pertain to interposed layers, 3 pertains to a substrate and 4 pertains to an upper clad layer.

In a waveguide path comprising a substrate formed of high molecular material and a waveguide path layer formed of organic high molecular material, the above-mentioned drawbacks are overcome by providing at least one intermediate layer with the following characteristics: each intermediate layer is formed of a material having a smaller refractive index than those of the material forming waveguide layers; further, each intermediate layer has a different solubility in a solvent.

Specifically, this invention relates to a thin film waveguide path comprising:

a waveguide path layer comprising a transparent organic high molecular material (A);

at least one intermediate layer comprising organic high molecular material (B) having a solvent solubility different from that of the high molecular material (A) and a refractive index lower than that of the high molecular material (A); and a substrate comprising an organic high molecular material (C), for supporting the waveguide path layer and the intermediate layer or layers, which material differs from said high molecular material (B).

This invention also relates to a method for forming the thin film waveguide path comprising the steps of:

applying and drying a solution of the high molecular material (B) having a solvent solubility different from that of the high molecular material (C) on the substrate comprising organic high molecular material (C), having enough thickness and strength for support thereby forming an intermediate layer; and applying and drying a solution of transparent high molecular material (A) having a refractive index higher than that of the high molecular material (B), which does not substantially dissolve the intermediate layer, thereby forming a waveguide path layer.

As a substrate to be used in this invention, any type of organic high molecular material having sufficient thickness and strength for support is suitable. However, low cost material is preferable in accordance with the objects of this invention.

Material (C), can be formed of polymethyl methacrylate, polycarbonate, polyester, nylon, polyethylene, polysulfonne, polystyrene, for example. Suitable kinds of materials to be used for layer C selected in consideration of its end use as set forth herein and its relationship with the material of the intermediate layer as set forth herein.

The organic high molecular material (A) forming a beam waveguide layer in this invention may comprise known material having sufficient transparency for use as the beam waveguide path layer. Suitable materials (A) are, for example, acrylate series resin, such as polymethyl methacrylate and polycyclohexyl methacrylate, polycarbonate, polystyrene series polymer, such as polystyrene and poly($\alpha$-methyl styrene), polysulfone, and polyurethane.

In this invention, the use of the intermediate layer or layers and the selection of the material (B) comprising the intermediate layer or layers are the most important. The following characteristics are essential for the organic high molecular material (B):

(1) It differs from the high molecular material (A) forming the waveguide path layer in solvent solubility.

(2) It has a refractive index lower than that of the high molecular material (A).

(3) It is formed by an organic high molecular material different from the substrate or substrates.

As discovered by the inventors, it is noted that a lamination of materials having different solvent solubility results in a remarkable reduction of beam propagation loss. In this invention, the different solvent solubility results in the feature that, after forming the intermediate layer and at the time when the beam waveguide path layer is formed, the surface of the intermediate layer can be coated with solvent of the high molecular material for the beam waveguide path, without a substantial change such as dissolving or swelling the surface of the intermediate layer.

This phenomenon is quantitatively expressed by a difference between solutility parameters according to the definition of Polymer Handbook (J. Brandrup and E. H. Immergut; John Wiley & Sons, New York; 1975; 2nd edition), and the value should be:

not less than $2.0 \times 10^{-3}$ $(J/m^3)^{\frac{1}{2}}$,
preferably not less than $2.5 \times 10^{-3}$ $(J/m^3)^{\frac{1}{2}}$,
most preferably not less than $3.0 \times 10^{-3}$ $(J/m^3)^{\frac{1}{2}}$.

According to this invention, the provision of the intermediate layer or layers allows unevenness of the surface of a substrate, which comprises a commercially available organic high molecular material, to be reduced, and reduces the unevenness of the interface at the beam waveguide path layer when laminating a further beam waveguide layer. As a consequence a beam waveguide path comprising organic high molecular material enjoys a substantial decrease in beam propagation loss.

The intermediate layer or layers any materials as long as the above object is achieved. Hence, such layer may be a mono-layer or plural layers. A laminated construction of plural layers is used when higher performance than a mono-layer is requested, as, for example, when high adhesion is desired between the substrate and waveguide path layers.

The material (B) forming the intermediate layer or may comprise any material having the above characteristics, but relatively transparent resin is preferably selected. Suitable materials include cellulose acetate, nitrocellulose, polyvinyl alcohol, polyurethane, poly(fluoroalkyl methacrylate) and epoxy resin. Material (B) is selected by considering the above objects, along with its end use and relation to the materials forming the substrate or waveguide path layer, as set forth herein.

With reference to the accompanying drawings, FIG. 1 shows an embodiment of the invention wherein an intermediate layer 2 comprises a mono-layer while FIG. 2 shows a further embodiment wherein intermediate layers 2a, 2b are plural.

In these embodiments, polymethyl methacrylate or polycarbonate plastic plate of low cost and 1 to 30 mm in thickness is employed for a substrate 3. The substrate 3 is preferably baked at a temperature near the glass transition temperature (Tg), but this may not be necessary. In FIG. 1, for the intermediate layer 2, cellulose acetate, nitrocellulose, polyvinyl alcohol, by way of example, are selected. The foregoing polymers dissolve well in solvent such as water, alcohol, dimethyl formamide or carbonyl compounds such as acetone. Beneficially, these solvents barely dissolve the transparent high molecular material typically used for a beam waveguide path layer.

When it is a problem to get adherence to the substrate 3 as is the case the intermediate layer 2 is formed of polyvinyl alcohol, an intermediate layer 2b comprising polyurethane, for example, is coated on the substrate 3 as shown in FIG. 2 and another intermediate layer 2a is coated on the layer 2b for overcoming the adherence problem. These intermediate layers 2a, 2b are normally 0.5 to 2 $\mu$m in thickness, but may be 0.01-10 $\mu$m in thickness.

If a high molecular compound having a refractive index larger than that of the intermediate layers 2, 2a, 2b is coated as the waveguide path layer 1 with a solution dissolved in a solvent which does not dissolve the high molecular compound at the same rate as when coated on an optically polished glass substrate, a beam waveguide path of less than 1 dB/cm of the wave propagation loss is easily achieved. The thickness of the beam waveguide path layer 1 is normally 0.2 to 5.0 $\mu$m, but a wider range than the above, for example, of 0.1-10 $\mu$m is also suitable.

In this invention, the method of providing the intermediate layer 2 and beam waveguide path layer 1 is not crucial.

To obtain homogeneous layer thickness, flow elongation and bar coat methods are suitable, but the spin coat method is more preferred as it is simple and controls homogeneity of the thickness.

The beam waveguide path of the invention is preferably employed when used as a single mode thin film waveguide path. Furthermore, the light waveguide path can be processed in the same manner as for a conventional waveguide path and is usable for various beam optical devices.

The light waveguide path of this invention is provided with an arbitrary upper layer. When such upper layer is provided, a high molecular compound dissolved in solvent which does not substantially dissolve the light waveguide path layer is coated and dried to form the upper layer. When such upper layer is utilized as a clad layer, its refractive index should be lower than that of a high molecular compound employed for the light waveguide path.

The invention will now be further described with reference to the various examples.

EXAMPLE 1

For a substrate 1 of 2 mm thickness, a polymethyl methacrylate plate is used and cleaned by isopropanol, and then baked at 110° C. for one hour and naturally cooled. To form the intermediate layer 2, a solution of nitrocellulose of the solubility parameter $22.0 \times 10^{-3}$ $(J/m^3)^{\frac{1}{2}}$ which is dissolved in a mixed solvent of isopropanol-dimethylformamide is spin coated and then dried. At this state, the thickness of the intermediate layer is 0.131 μm. Then, a solution of polycarbonate of the solubility parameter $19.5 \times 10^{-3}$ $(J/m^3)^{\frac{1}{2}}$ which is dissolved in chloroform is spin coated and then dried; accordingly, a beam waveguide path layer 3 of 0.813 μm in thickness is thus achieved.

The resulting waveguide path shows good adherence to each layer.

When the resulting waveguide path is measured by TE waves using 6328 Å He-Ne laser beam, the waveguide mode is the single mode and the beam propagation loss is less than 0.3 dB/cm.

EXAMPLES 2–8 and comparing examples 1–4

Beam waveguide paths of various multiple layer construction have been produced along the Example 1 except for various changes of the substrate 3, intermediate layer 2 and waveguide path layer 1.

Those results are shown together with Example 1 in Table 1.

EXAMPLE 9

The waveguide path achieved in EXAMPLE 7 is spin-coated with a solution in which cellulose acetate is dissolved in dimethylformamide as used in the intermediate layer 2, and then dried, and provided with a 0.08 μm thickness clad layer.

As to the waveguide mode of the waveguide path 1 is the single mode when measured by TE wave as in EXAMPLE 7 and the propagation loss is as good as 0.2 dB/cm.

TABLE 1

| | waveguide path layer | | | intermediate layer | | | substrate material (c) | affinity | waveguide mode number (TE wave) | light propagation loss dB/cm |
|---|---|---|---|---|---|---|---|---|---|---|
| | material (a) (solvent) | solubility parameter $(J/m^3)^{\frac{1}{2}} \cdot 10^{-3}$ | layer thickness μm | material (b) (solvent) | solubility parameter $(J/m^3)^{\frac{1}{2}} \cdot 10^{-3}$ | layer thickness μm | | | | |
| Examples | | | | | | | | | | |
| 1 | PC (CHCl₃) | 19.5 | 0.813 | NC (DMF) | 22.0 | 0.131 | PMMA | good | 1 | 0.3 |
| 2 | PMMA (benzene) | 19.0 | 2.98 | CA (DMF) | 24.5 | 1.03 | PMMA | good | 1 | 0.2 |
| 3 | Pα-MS (CHCl₃) | 18.5 | 0.550 | NC (DMF) | 22.0 | 0.310 | PC | good | 1 | 1.0 |
| 4 | Pα-MS (CHCl₃) | 18.5 | 0.550 | PVA (water) | 25.8 | 0.341 | PMMA | good | 1 | 0.5 |
| 5 | PSF (CHCl₃) | 18.8 | 0.521 | NC (DMF) | 22.0 | 0.231 | PMMA | good | 1 | 0.5 |
| 6 | PSF (CHCl₃) | 18.8 | 1.11 | PVA (water) | 25.8 | 0.325 | PMMA | good | 2 | 0.7 (TEo) |
| 7 | PCHMA (toluene) | 19.2 | 1.30 | CA (DMF) | 24.5 | 0.13 | PMMA | good | 1 | 0.2 |
| 8 | PCHMA (benzene) | 19.2 | 1.30 | FM (DMF) | — | 0.13 | PMMA | good | — | 0.2 (TEo) |
| Comparison Examples | | | | | | | | | | |
| 1 | PC (CHCl₃) | 19.5 | 0.650 | nil | — | — | optically polished glass | bad | 1 | 0.3 |
| 2 | PC (CHCl₃) | 19.5 | 0.641 | nil | — | — | PMMA | good | 1 | more than 20 |
| 3 | Pα-MS (CHCl₃) | 18.5 | 0.750 | nil | — | — | PMMA | good | 1 | more than 20 |
| 4 | PMMA (benzene) | 19.0 | 0.962 | nil | — | — | Pyrex glass (not polished) | good | 1 | 1.9 |

Notes: Abbreviation and refractive index
PC: polycarbonate (1.585)
NC: nitrocellulose (1.52)
PMMA: poly(methyl methacrylate) (1.49)
CA: cellulose acetate (1.48)
Pα-MS: poly(α-methylstyrene) (1.59)
PVA: poly(vinyl alcohol) (1.53)
PSF: polysulfone (1.63)
PCHMA: poly(cyclohexylmethacrylate) (1.505)
FM: tetrafluorobutylmethacrylate-methylmethacrylate co-polymer (1.429)
optically polished glass (1.515)
Pyrex glass (1.47)
Abbreviation of employed solvent
CHCl₃: chloroform
DMF: dimethylformaldehyde

EXAMPLE 10

The same substrate 3 as in EXAMPLE 1 is employed, cleaned by isopropanol, then baked at 110° C. for one hour, and cooled.

Subsequently, for the intermediate layer 2b, a polyurethane solution of the solubility parameter $22.0 \times 10^{-3}$ $(J/m^3)^{\frac{1}{2}}$ dissolved in dimthyl formamide is spin-coated and dried. Its layer thickness is 1.2 μm. Then for the intermediate layer 2a, polyvinyl alcohol of solubility parameter $25.8 \times 10^{-3}$ $(J/m^3)^{\frac{1}{2}}$ dissolved in water is also spin-coated and dried. Its thickness is 0.462 μm.

Polycarbonate (solubility parameter $19.5 \times 10^{-3}$ $(J/m^3)^{\frac{1}{2}}$) solution dissolved in chloroform is spin-coated on the substrate 3 with the intermediate layers 2a, 2b and then dried thereby forming beam waveguide path layer 1 of a film thickness of 0.673 μm.

The resulting beam waveguide path has good affinity for each layer. When the waveguide mode is measured by the same TE wave as in Example 1, it shows the single mode, and the propagation loss is 0.8 dB/cm in good outcome.

EXAMPLE 11

The beam waveguide path is produced along Example 10 except use of poly α-methylstyrene of solubility parameter $18.5 \times 10^{-3}$ $(J/m^3)^{\frac{1}{2}}$ instead of polycarbonate.

The resulting waveguide path shows a good affinity for each layer. When a waveguide mode is measured by the same TE wave as in Example 1, it is the single mode, and the beam propagation loss is 0.8 dB/cm.

EXAMPLE 12

In the Example 8, the substrate is prepared with a change of PMMA to PC, and it also shows excellent affinity and low beam propagation loss.

EXAMPLE 13

The light waveguide path obtained by EXAMPLE 2 is spin-coated by a solution in which nitrocellulose of the refractive index of 1.52 is dissolved in dimethyl formamide and dried. The thickness in this case is 0.05 μm. Then, ultraviolet ray cured type photoresist is spin-coated to 0.1 μm thickness on the path, and exposed by a interference exposure method with He-Cd laser, thereby forming a pattern of line and space of 0.5 μm. Then nitrocellulose is etched by an ion beam, and a light waveguide path with a grating formed on the waveguide path layer is thus obtained.

EXAMPLE 14

The same substrate 3 as in EXAMPLE 1 is employed, cleaned by isopropanol, then baked for one hour at 110° C. and cooled naturally. Subsequently, it is spin coated by cellulose acetate solution of solubility parameter $24.5 \times 10^{-3}$ $(J/m^3)^{\frac{1}{2}}$, dissolved in dimethyl formamide for the intermediate layer 2c and dried. Its thickness is 0.13 μm. Then, polycyclohexylmethacrylate solution of $19.2 \times 10^{-3}$ $(J/m^3)^{\frac{1}{2}}$ of solubility parameter dissolved in toluene is spin-coated for a first light waveguide path layer 1 and then baked for 2 hours at 95° C. Its thickness is 1.4 μm. Then, cellulose acetate dissolved in dimethylformamide is spin-coated on the first light waveguide path layer 1, and dried providing an upper clad layer 4 with 3 μm thickness. Furthermore, polycyclohexylmethacrylate dissolved in toluene is spin coated for a second light waveguide path layer 1a as is for the first light waveguide path layer 1 and baked, providing a 1.4 μm thick coat, thereby forming the light waveguide path having two layers of the first and second light waveguide path layers 1, 1a. In this case, the light propagation loss is 0.2 dB/cm for both the first and second light waveguide paths.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A thin film waveguide path comprising:
    a waveguide path layer comprising a transparent, first organic high molecular material;
    at least one intermediate layer comprising a second organic high molecular material which has a solvent solubility different from that of said first high molecular material and a refractive index lower than that of said first high molecular material; and
    a substrate comprising a third organic high molecular material different from that of said second high molecular material for supporting said waveguide path layer and said intermediate layer;
    said waveguide path layer overlying said one intermediate layer and said one intermediate layer overlying said substrate.

2. A waveguide path according to claim 1, wherein said first and second organic high molecular materials exhibit a difference in solubility of not less than $2.0 \times 10^{-3}$ $(J/m^3)^{\frac{1}{2}}$.

3. A waveguide path according to claim 1, wherein said intermediate layer has a laminated construction comprising layers for providing a smoother surface than a surface of said substrate overlain by said intermediate layer.

4. A waveguide path according to claim 1, wherein said first high molecular material is selected from a group consisting of acrylate series resin, polycarbonate, polystyrene series polymer, polysulfon and polyurethane.

5. A waveguide path according to claim 1, wherein said second intermediate material is one selected from a group consisting of cellulose acetate, nitrocellulose, polyvinyl alcohol, polyurethane, epoxy resin, and poly(fluoroalkyl methacrylate).

6. A waveguide path according to claim 1, wherein the said third high molecular material is selected from a group consisting of polymethyl methacrylate, polycarbonate polyester, nylon, polyethylene, polysulfone and polystyrene.

7. A method for manufacturing a thin film waveguide path including a substrate, an intermediate layer, and a waveguide layer laminated in the foregoing order, the method comprising the steps of:
    providing a substrate comprising a first organic high molecular material and having sufficient thickness and strength to be self-supporting;
    forming an intermediate layer atop said substrate by applying and drying a solution of a second high molecular material on said substrate, said second material being different than said first high molecular material; and
    forming a waveguide layer atop said intermediate layer by applying and drying a solution of a transparent third high molecular material having a refractive index higher than that of said second high molecular material and having a solvent solubility different from that of said second material so that said second material does not substantially dissolve in response to a solvent used to dissolve said third material.

* * * * *